(12) United States Patent
Franzen

(10) Patent No.: US 9,321,113 B2
(45) Date of Patent: Apr. 26, 2016

(54) SHARPENING DEVICE FOR POWER SAW CHAINS

(75) Inventor: Johannes Franzen, Mechernich-Holzheim (DE)

(73) Assignee: Johannes Franzen GmbH & Co. KG, Mechernich-Holzheim (DE)

( * ) Notice: Subject to any disclaimer, the term of this patent is extended or adjusted under 35 U.S.C. 154(b) by 1189 days.

(21) Appl. No.: 13/259,424

(22) PCT Filed: Mar. 15, 2010

(86) PCT No.: PCT/DE2010/000279
§ 371 (c)(1),
(2), (4) Date: Nov. 9, 2011

(87) PCT Pub. No.: WO2010/108470
PCT Pub. Date: Sep. 30, 2010

(65) Prior Publication Data
US 2012/0067175 A1    Mar. 22, 2012

(30) Foreign Application Priority Data

Mar. 25, 2009   (DE) .......................... 10 2009 014 231
May 13, 2009    (DE) .......................... 10 2009 021 183

(51) Int. Cl.
*B23D 63/16* (2006.01)
*B23D 63/00* (2006.01)

(52) U.S. Cl.
CPC ............ *B23D 63/003* (2013.01); *B23D 63/005* (2013.01); *B23D 63/16* (2013.01)

(58) Field of Classification Search
CPC .................. B23D 63/12; B23D 63/16–63/168
USPC ........... 76/80.5, 37, 42, 43; 451/419, 420, 45, 451/5, 8; 700/179
See application file for complete search history.

(56) References Cited

U.S. PATENT DOCUMENTS

| 4,102,223 A | 7/1978 | Robinson et al. |
| 5,033,333 A | 7/1991 | Shepherd |
| 5,117,713 A * | 6/1992 | Markusson ........................ 76/40 |
| 5,471,897 A * | 12/1995 | Wright ............................... 76/37 |

FOREIGN PATENT DOCUMENTS

| CA | 1084713 | 9/1980 |
| DE | 3942161 A1 | 7/1990 |
| WO | 8809237 A1 | 12/1988 |
| WO | 03022520 A1 | 3/2003 |

OTHER PUBLICATIONS

International Search Report and Written Opinion dated Nov. 4, 2010 from PCT/DE2010/000279.
International Preliminary Report on Patentability from PCT/DE2010/000279 dated Nov. 2, 2011, 5 pages.

* cited by examiner

*Primary Examiner* — Laura M Lee
(74) *Attorney, Agent, or Firm* — Ohlandt, Greeley, Ruggiero & Perle, L.L.P.

(57) ABSTRACT

A sharpening device for power chain saws, comprising a chain clamping unit and an advance element for advancing the saw chain. The chain clamping unit and the advance element are arranged on a base plate. In a given arrangement, the chain clamping unit and the advance element can be arranged on the base plate and different base plates having elements arranged thereon can be used for sharpening different power chain saws.

12 Claims, 3 Drawing Sheets

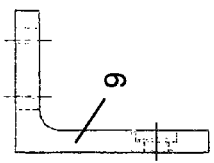
FIG. 12
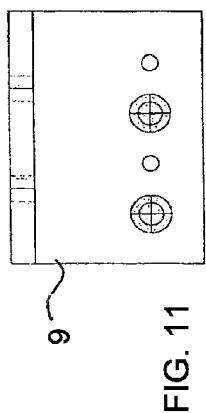
FIG. 11
FIG. 13
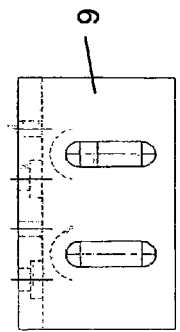
FIG. 10
FIG. 9
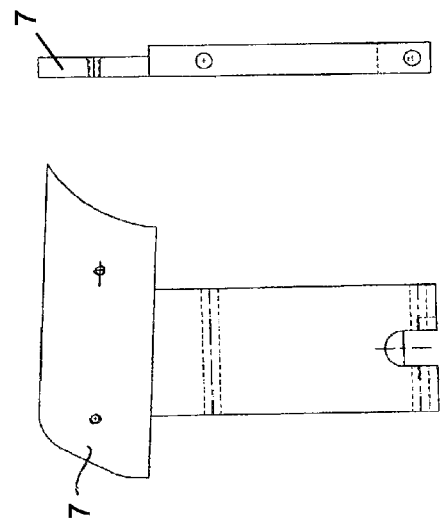
FIG. 8
FIG. 7
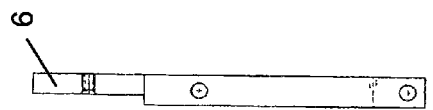
FIG. 6
FIG. 5
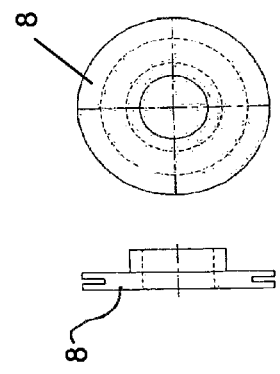
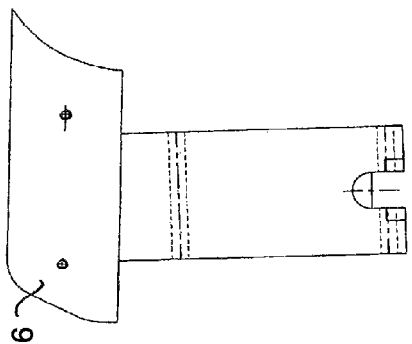

SHARPENING DEVICE FOR POWER SAW CHAINS

BACKGROUND

1. Field of the Disclosure

The disclosure relates to a sharpening device for power saw chains. This type of sharpening device, for example, is known from DE 39 42 161 A1 ("the '161 publication). With respect to the present Application, reference is made to the full extent to the '161 publication. All features described in the '161 publication are also optional features in the present sharpening device.

2. Discussion of the Background Art

It has turned out to be advantageous to construct a sharpening device from a basic body on which a chain clamping unit, an advance element and a grinding wheel are disposed. An optimal grinding or sharpening of a power saw chain can be achieved by a suitable positioning of grinding wheel, chain clamping unit and advance element relative to one another. For this purpose, the sharpening device is prepared by the factory for the sharpening of a specific power saw chain. A sharpening device in the as-delivered state can be re-positioned by the adjustable fastening of chain clamping unit, advance element and grinding wheel, or in fact can be retro-fitted so that it is also suitable for sharpening another power saw chain.

Counter to the advantage of individual adjustment of the sharpening devices, however, is the disadvantage that it is difficult, when sharpening different power saw chains, to always adjust the sharpening device rapidly and reproducibly to different power saw chains.

In particular, the development of particularly complicated power saw chains with different saw teeth and different sharpening angles requires a high degree of knowledge on the part of the personnel who operate a sharpening device and must adjust the device for an optimal sharpening.

The problem of the disclosure is therefore to further develop or enhance a sharpening device in such a way that it can be more easily adjusted for different power saw chains.

SUMMARY

This problem is solved with a sharpening device for power saw chains that has a chain clamping unit and an advance element for advancing the saw chain in that this sharpening device has a base plate on which the chain clamping unit and the advance element are disposed.

The arrangement of chain clamping unit and advance element on a base plate makes it possible to attach these two units on the base plate in optimal alignment and precisely adapt them to one another individually for a particular power saw chain. The operating personnel thus can simply change the base plate with clamping unit disposed thereon and advance element attached thereon when changing one power saw chain for another, in order to rapidly sharpen another power saw chain. A precise alignment of clamping unit and advance element can be omitted, since both elements are already prepared and disposed on the base plate for a particular power saw chain.

In practice, the power saw chain grinder or sharpener is equipped with a sharpening device having a basic body on which the grinding wheel, the drive and the control are disposed. In addition, the sharpening device has a base plate with a chain clamping unit and an advance element. This base plate having the elements disposed thereon, however, can be changed, so that for each power saw chain to be sharpened, in each case there is a different base plate having these elements disposed thereon and affixed to the basic body of the sharpening device.

By supplying these types of base plates with elements fixed thereon, the manufacturer of power saw chains can proceed from the fact that his power saw chains are always sharpened precisely, corresponding to a precise adjustment of chain clamping unit and advance element.

It is advantageous if a chain deflector is also disposed on the base plate. This permits a simple construction and the provision of particular chain deflectors for different power saw chains.

In order to be sure that the chain clamping unit is disposed on the base plate in the correct position relative to the base plate, it is proposed that the chain clamping unit is disposed fixed in position on the base plate. Pins or catch elements that force one or more fixed, pre-given positions can serve for this purpose.

A corresponding situation applies to the advance element that is also preferably disposed in a fixed position on the base plate.

A particularly preferred example of embodiment provides that a harness is also disposed on the base plate. The harness makes it possible to bring together all of the cables that are necessary for the units disposed on the base plate and to join them together to a basic body of a sharpening device.

The cables of the chain clamping unit and of the advance element were previously usually screwed on or rigidly connected to these units or elements and the basic body.

Now, in order to easily remove the base plate with chain clamping unit and advance element from the basic body of the sharpening device, it is proposed that the harness has a plug. This plug preferably has electrical and pneumatic lines.

Thus, a relatively large plug is provided, in which preferably all electrical and pneumatic lines that must be guided between the elements on the base plate and the basic body of the sharpening device are gathered together. In practice, the base plate still only needs to be attached to the basic body, and the plug provided on the base plate will be plugged into a plug socket on the basic body. Understandably, the plug can also be provided on the basic body and the socket can be provided on the line.

For a simple construction of the sharpening device, it is proposed that the base plate is attached to a basic body that has a grinding wheel and a drive. Grinding wheel and drive may be disposed in the conventional manner on the basic body and a defined movement of the grinding wheel can be operated. Usually, this movement can be maintained unchanged, although different base plates are used for different power saw chains.

It is advantageous if the basic body has a control. This control, on the one hand, can serve for the purpose of guiding the grinding wheel, and on the other hand, the control can also actuate the chain clamping unit and the advance element. A particular advance element that moves relative to the chain clamping unit is known, for example, from DE 39 42 161.

The control must have different control programs for different base plates. It is therefore proposed that the control has a memory with different control programs. This makes it possible to allow different control programs to run, each time depending on the base plate that has been attached.

It is thus proposed that the control has a switch that has different switching states when different base plates are introduced on the basic body. When the base plate is introduced on the basic body, for example, different programs can be triggered by pins attached to different positions on the base plate, depending on which base plate is introduced. An optical signal can also be read out on the base plate, however, by a corresponding unit on the basic body. In this way, when the base plate is introduced, a particular program that is adapted to the base plate can be addressed automatically in the control without further mechanical adjustments.

The switch can also be provided via the plug that connects the base plate to the basic body. In this case, information on the switching states is communicated via the number and/or assignment of the electrical and/or pneumatic elements of the plug. In this way, information on the individual configuration of the base plate is communicated as soon as the plug is plugged into the basic body. This information serves for preparing and initializing a sharpening program individually adapted to the particular base plate.

In order to further guide the control signals of the control to the units on the base plate in a simple manner, it is provided that the control has a pneumatic system.

In order to easily join the cables of the harness to the basic body, it is proposed that the basic body has a plug connection for a plug of a harness.

The base plate can be created in such a way that it is attachable to the basic body only in a particular, pre-given position. It has turned out, however, that it is advantageous, if the base plate can be pivoted and can be fastened in a fixed manner to the basic body. This permits the base plate to be attached first to a particular place so as to be able to rotate around an axis, then subsequently the pivoting position can be adjusted according to adjustment specifications and then the base plate can be fixed to the basic body. A simple example of embodiment provides that the base plate can be fixed with a pin in pre-given pivoting angles.

An example of embodiment of this type of base plate is shown in the drawing.

BRIEF DESCRIPTION OF THE DRAWINGS

Here:

FIG. 5 shows a view of a first clamping jaw, FIG. 6 shows a lateral view of the first clamping jaw, FIG. 7 shows a view of a second clamping jaw, FIG. 8 shows a lateral view of the second clamping jaw, FIG. 9 shows a view of a deflecting roller, FIG. 10 shows a lateral view of the deflecting roller shown in FIG. 9, FIG. 11 shows a view of a retaining device for the advance element, FIG. 12 shows a lateral view of the retaining device shown in FIG. 11 and FIG. 13 shows a top view onto the retaining device shown in FIG. 11.

DETAILED DESCRIPTION OF THE PREFERRED EMBODIMENT

Figure 1:
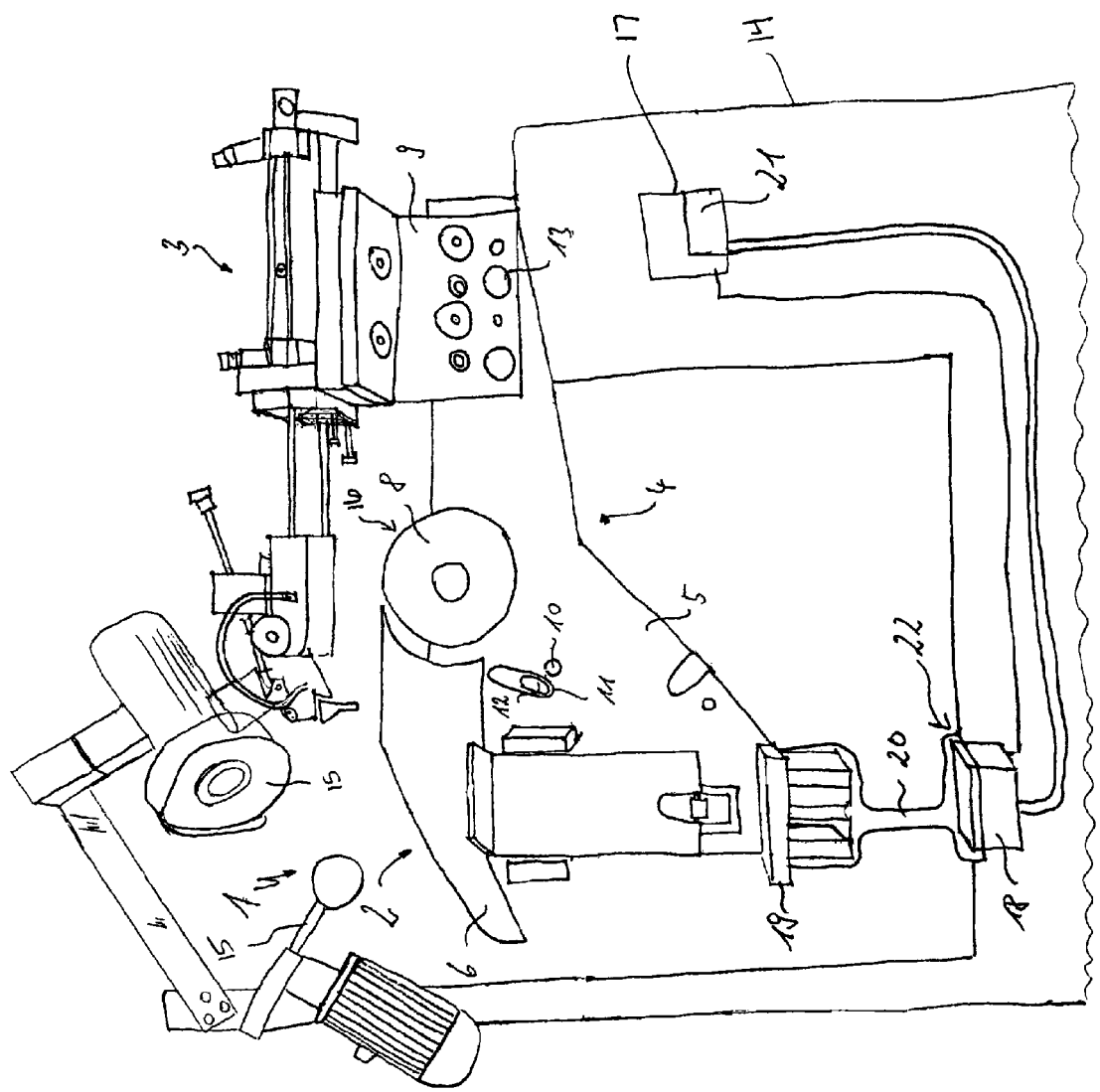
FIG. 1 shows schematically a sharpening device of the present invention having a base plate attached to a basic body.

A sharpening device 1 shown in FIG. 1 essentially comprises a clamping device 2 and an advance element 3, which are disposed on a base plate 4.

A more precise rendering of the base plate having the units disposed thereon for retaining the chain clamping unit 2 and the advance element 3 can be taken from FIGS. 2 to 13.

Figure 3:
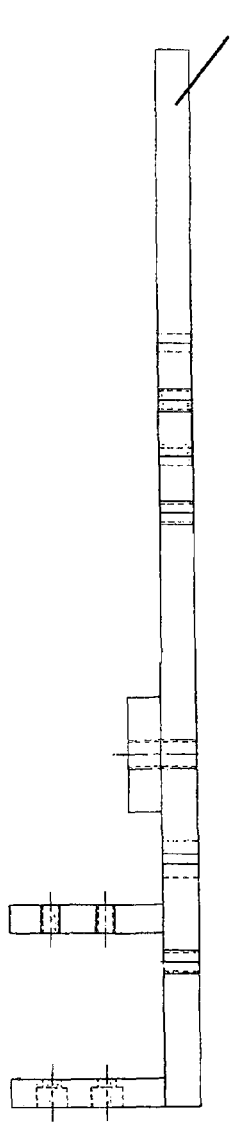
FIG. 3 shows a section through the base plate shown in FIG. 2 along line AA.
Figure 4:
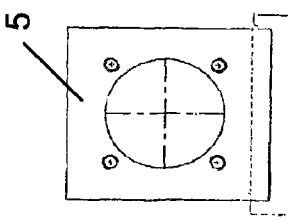
FIG. 4 shows a section through the base plate shown in FIG. 2 along line BB.
Figure 2:
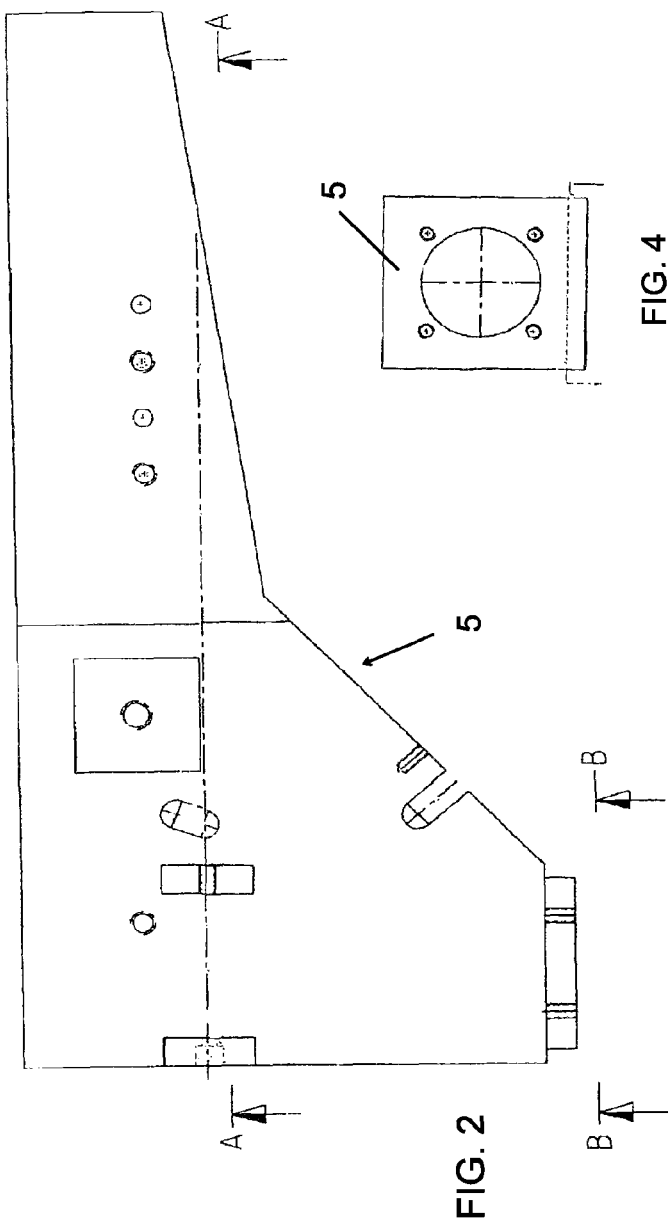
FIG. 2 shows a front view of the base plate.

Here, FIGS. 2 to 4 show a body 5 of the base plate, to which are attached two clamping jaws 6 and 7, shown in FIGS. 5 to 8. The clamping jaws serve as chain clamping unit 2 for this purpose of holding the chain of a power saw. The power saw chain (not shown) is deflected here by a deflecting roller 8, which is shown more precisely in FIGS. 9 and 10.

The advance element 3 is disposed on a retaining device 9, which is shown in FIGS. 11 to 13.

When the sharpening device is used, the base plate 4 is first disposed in a rotatable manner around point 10 on a known basic body 14 of a power saw chain grinding machine. Basic body 14 has one or more grinding wheels 15 and a drive 16, each disposed in the conventional manner on basic body 14. Here, the rotatability of the base plate 4 relative to the basic body 14 is limited by a pin 12 guided into a longitudinal hole 11. By means of another pin, which extends through a borehole 13 into a borehole in the basic body 14, the base plate 4 is fixed in its angular alignment relative to the basic body 14.

This makes it possible to hold a power saw chain in position with the clamping jaws 6 and 7 as clamping unit 2 and to provide for a defined advance with the advance element 3 attached to retaining device 9.

The arrangement shown in FIG. 1 clearly shows that the entire system made up of base plate 4, clamping unit 2 and advance element 3 can be easily removed from the basic body 14 of the sharpening device and in this way can be changed. To facilitate removal of the base plate 4 from the basic body 14, a harness 20 having a plug 19 is provided. In practice, the base plate 4 still only needs to be attached to the basic body 14, and the plug 19 provided on the base plate 4 will be plugged into a plug connection 22 on the basic body 14. As stated above, it is advantageous if the basic body 14 has a control 17. The control 17 has different control programs for different base plates. The control 17 also has a switch 18 that has different switching states when different base plates 4 are introduced on the basic body 14. When the base plate 4 is introduced on the basic body 14, for example, different programs can be triggered by pins attached to different positions on the base plate 14, depending on which base plate 4 is introduced. An optical signal can also be read out on the base plate 4, however, by a corresponding unit on the basic body 14. The switch 18 can also be provided via the plug 19 that connects the base plate 4 to the basic body 14.

When this system is changed, the electrical connections and optional pneumatic connections 21 must also be detached and thus a harness 20 is provided on the arrangement shown in FIG. 1, this harness 20 making it possible to join the arrangement to the basic body 14 of the sharpening device with a simple plug connection 22.

What is claimed is:

1. A sharpening device for a power saw chain, the sharpening device comprising:
   a base plate having disposed thereon a chain clamping unit and an advance element which advances a power saw chain;
   a basic body having a grinding wheel, and a drive, wherein said base plate is removably attached to the basic body, wherein the basic body has a control that has a memory with different control programs, and the control has a switch that has a switching state associated with said base plate, and a plug that joins said base plate with the basic body, and wherein when said plug is plugged into the basic body, information on an individual configuration of said base plate is communicated to the control.

2. The sharpening device according to claim 1, further comprising a chain deflector disposed on said base plate.

3. The sharpening device according to claim 1, wherein the chain clamping unit is disposed fixed in position on said base plate.

4. The sharpening device according to claim 1, wherein the advance element is disposed fixed in position on said base plate.

5. The sharpening device according to claim 1, further comprising a harness disposed on said base plate.

6. The sharpening device according to claim 5, wherein said harness has said plug.

7. The sharpening device according to claim 6, wherein said plug has electrical and pneumatic lines.

8. The sharpening device according to claim 1, wherein said base plate is at least one selected from a plurality of interchangeable base plates.

9. The sharpening device according to claim 1, wherein the control has a pneumatic system.

10. The sharpening device according to claim 1, wherein the basic body has a plug connection for said plug, and wherein said plug is a plug of a harness.

11. The sharpening device according to claim 1, wherein said base plate is pivotable and attachable to the basic body.

12. The sharpening device according to claim 1, wherein said base plate is attachable to the basic body in pre-given pivoting angles by means of a pin.

* * * * *